US011689061B2

(12) United States Patent
Daga et al.

(10) Patent No.: US 11,689,061 B2
(45) Date of Patent: Jun. 27, 2023

(54) CONTACTLESS SWAPPABLE BATTERY SYSTEM

(71) Applicant: Momentum Dynamics Corporation, Malvern, PA (US)

(72) Inventors: Andrew W. Daga, Malvern, PA (US); Matthew L. Ward, Exton, PA (US); Francis J. McMahon, Malvern, PA (US)

(73) Assignee: InductEV Inc., King of Prussia, PA (US)

( * ) Notice: Subject to any disclaimer, the term of this patent is extended or adjusted under 35 U.S.C. 154(b) by 0 days.

(21) Appl. No.: 17/755,454

(22) PCT Filed: Oct. 30, 2020

(86) PCT No.: PCT/US2020/058319
§ 371 (c)(1),
(2) Date: Apr. 29, 2022

(87) PCT Pub. No.: WO2021/087332
PCT Pub. Date: May 6, 2021

(65) Prior Publication Data
US 2022/0368161 A1 Nov. 17, 2022

Related U.S. Application Data

(60) Provisional application No. 62/928,015, filed on Oct. 30, 2019.

(51) Int. Cl.
*H02J 50/12* (2016.01)
*H01M 10/613* (2014.01)
(Continued)

(52) U.S. Cl.
CPC .............. *H02J 50/12* (2016.02); *B60L 50/64* (2019.02); *B60L 53/12* (2019.02); *B60L 53/80* (2019.02);
(Continued)

(58) Field of Classification Search
CPC ...... H02J 50/12; H02J 7/00045; H02J 7/0013; H02J 7/0045; H02J 7/0047; H02J 7/02;
(Continued)

(56) References Cited

U.S. PATENT DOCUMENTS 5,378,555 A 1/1995 Waters et al.
6,496,949 B1 12/2002 Kanevsky et al.
(Continued)

FOREIGN PATENT DOCUMENTS

CN 106427936 A * 2/2017 .............. B60L 50/64
DE 202019101228 U1 * 8/2019 .......... H01M 10/425
(Continued)

OTHER PUBLICATIONS

T. V. Prabhakar, U. Mysore, U. Saini, K. J. Vinoy and B. Amruthur, "NFC for Pervasive Healthcare Monitoring," 2015 28th International Conference on VLSI Design, 2015, pp. 75-80, doi: 10.1109/VLSID.2015.18. (Year: 2015).*
(Continued)

*Primary Examiner* — M Baye Diao
(74) *Attorney, Agent, or Firm* — Culhane Meadows PLLC; Michael P. Dunnam

(57) ABSTRACT

A contactless battery system includes a sealable dustproof and waterproof case that houses a battery unit and at least one wireless power transmission coupler connected to the battery unit. The at least one wireless power transmission coupler is disposed with respect to at least one face of the sealable case to enable magnetic inductive signaling for charging, discharging, and communication with the battery.
(Continued)

Without physical contacts, the battery is inherently safe since voltage and current are not available to the touch. The lack of physical contacts also means that contact wear is eliminated and the battery modules have the benefit of inherent galvanic isolation. Since the battery system is sealed, internal intrusion detection systems may be used to detect improper attempts at battery changes or attacks on the electronics containing the usage and charging records in an attempt to increase the battery unit's value on the secondary battery market.

22 Claims, 10 Drawing Sheets

(51) Int. Cl.
| | |
|---|---|
| H01M 10/615 | (2014.01) |
| H01M 10/625 | (2014.01) |
| B60L 53/12 | (2019.01) |
| B60L 58/27 | (2019.01) |
| B60L 50/64 | (2019.01) |
| B60L 53/80 | (2019.01) |
| B60L 58/26 | (2019.01) |
| H02J 7/00 | (2006.01) |
| H01M 50/249 | (2021.01) |
| H01M 50/24 | (2021.01) |
| H01M 50/242 | (2021.01) |
| H01M 50/264 | (2021.01) |
| H01M 50/204 | (2021.01) |
| H01M 10/42 | (2006.01) |
| H01M 10/46 | (2006.01) |
| H01M 10/48 | (2006.01) |
| H01M 16/00 | (2006.01) |
| H02J 7/02 | (2016.01) |

(52) U.S. Cl.
CPC ............. *B60L 58/26* (2019.02); *B60L 58/27* (2019.02); *H01M 10/425* (2013.01); *H01M 10/46* (2013.01); *H01M 10/482* (2013.01); *H01M 10/486* (2013.01); *H01M 10/613* (2015.04); *H01M 10/615* (2015.04); *H01M 10/625* (2015.04); *H01M 16/006* (2013.01); *H01M 50/204* (2021.01); *H01M 50/24* (2021.01); *H01M 50/242* (2021.01); *H01M 50/249* (2021.01); *H01M 50/264* (2021.01); *H02J 7/0013* (2013.01); *H02J 7/00045* (2020.01); *H02J 7/0045* (2013.01); *H02J 7/0047* (2013.01); *H01M 2010/4271* (2013.01); *H01M 2010/4278* (2013.01); *H01M 2220/20* (2013.01); *H02J 7/02* (2013.01)

(58) Field of Classification Search
CPC .......... H02J 9/062; B60L 50/64; B60L 53/12; B60L 53/80; B60L 58/26; B60L 58/27; B60L 53/11; H01M 10/425; H01M 10/46; H01M 10/482; H01M 10/486; H01M 10/613; H01M 10/615; H01M 10/625; H01M 16/006; H01M 50/204; H01M 50/24; H01M 50/242; H01M 50/249; H01M 50/264; H01M 2010/4271; H01M 2010/4278; H01M 2220/20; H01M 10/48; H01M 16/00; H01M 50/262; H01M 10/63; H01M 50/258; H01M 10/4264; Y02T 10/70; Y02T 10/7072; Y02T 90/14; Y02T 90/16
USPC ......................................................... 320/108
See application file for complete search history.

(56) References Cited

U.S. PATENT DOCUMENTS

| | | | |
|---|---|---|---|
| 9,112,364 B2 | 8/2015 | Partovi | |
| 9,787,127 B2 * | 10/2017 | Shen | H02J 50/10 |
| 9,876,396 B2 * | 1/2018 | Yoshida | H02J 7/0042 |
| 9,991,732 B2 * | 6/2018 | Blakely | H02M 1/08 |
| 10,110,030 B1 * | 10/2018 | Colosimo | H02J 50/12 |
| 10,615,387 B2 * | 4/2020 | Hjorth | H01M 50/24 |
| 10,938,251 B1 * | 3/2021 | Mehrabi | H02J 50/40 |
| 11,114,903 B2 * | 9/2021 | AbuKhalaf | H04B 5/0037 |
| 11,362,548 B1 * | 6/2022 | Ren | H04B 5/0037 |
| 11,489,366 B2 | 11/2022 | Kahlman | |
| 2008/0280195 A1 | 11/2008 | Kumar et al. | |
| 2010/0019730 A1 | 1/2010 | Chueh et al. | |
| 2012/0030480 A1 | 2/2012 | Ikeuchi et al. | |
| 2015/0061581 A1 * | 3/2015 | Ben-Shalom | H02J 7/00712 320/108 |
| 2015/0364799 A1 * | 12/2015 | Miller | H01M 10/482 320/108 |
| 2015/0365737 A1 * | 12/2015 | Miller | H02J 50/12 340/870.02 |
| 2018/0152042 A1 * | 5/2018 | Blakely | H02J 50/20 |
| 2018/0248413 A1 * | 8/2018 | Miller | H02J 50/80 |
| 2021/0091436 A1 | 3/2021 | Haring et al. | |

FOREIGN PATENT DOCUMENTS

| | | | |
|---|---|---|---|
| TW | I568133 B | 1/2017 | |
| WO | WO-9701207 A1 * | 1/1997 | H02J 7/025 |

OTHER PUBLICATIONS

Patent Cooperation Treaty, International Application No. PCT/US2020/058319, International Search Report, dated Jan. 28, 2021, 2 pages.

* cited by examiner

CONTACTLESS SWAPPABLE BATTERY SYSTEM

PRIORITY

This application claims the benefit of priority to U.S. Provisional Patent Application Ser. No. 62/928,015, filed Oct. 30, 2019, which is incorporated herein by reference in its entirety.

TECHNICAL FIELD

This disclosure describes the construction and use of replaceable battery pack using a contactless magnetic induction coupling for charging and discharging.

BACKGROUND

The concept of a replaceable battery has existed since the invention of the electric pile by Alessandro Volta in 1800.

The consumer need for non-proprietary, interchangeable batteries has led to the standardization of volumetric sizes, voltages, and terminals (i.e. contact points). These standards include, for example; The American National Standards Institute (ANSI) standard C18.1M, "National Standard For Portable Primary Cells and Batteries with Aqueous Electrolyte."

Wireless power transmission via magnetic resonance induction was introduced in the $19^{th}$ century A.D. but failed commercially due to a misunderstanding of the atmosphere's ability to form electrically conductive channels. The use of the flat wire coil for magnetic inductance was detailed in U.S. Pat. No. 512,340; "Coil for Electro-Magnets", Issued-Jan. 9, 1894.

As written by Robert A. Heinlein in the 1982 science fiction book, "Friday," "the problem was not a shortage of energy but lay in the transporting of energy. Energy is everywhere—in sunlight, in wind, in mountain streams, in temperature gradients of all sorts wherever found, in coal, in fossil oil, in radioactive ores, in green growing things. Especially in ocean depths and in outer space energy is free for the taking in amounts lavish beyond all human comprehension. Those who spoke of 'energy scarcity' and of 'conserving energy' simply did not understand the situation. The sky was 'raining soup'; what was needed was a bucket in which to carry it." Heinlein's fictional imaging for portable energy storage was called a "Shipstone."

The lithium-ion (Li-ion) battery (in its various configurations and chemistries) has been recognized for its value in energy storage, with the battery inventors receiving the 2019 Nobel Prize for Chemistry. However, use of batteries, including Li-ion, remains problematic for large scale power supply use unlike their fictional counterparts.

SUMMARY

Various examples are now described to introduce a selection of concepts in a simplified form that are further described below in the Detailed Description. The Summary is not intended to identify key or essential features of the claimed subject matter, nor is it intended to be used to limit the scope of the claimed subject matter.

A battery unit using resonant inductive coupling for wireless power transfer in sample embodiments offers the advantages of lack of contact wear and an environmentally sealed container, as well as the ability to be used in a wet or explosive atmosphere scenario.

In sample embodiments, a contactless battery system is provided that includes a dustproof and waterproof sealable case, a battery unit disposed within the sealable case, and at least one wireless power transmission coupler connected to the battery unit and disposed within the sealable case. The at least one wireless power transmission coupler is disposed with respect to at least one face of the sealable case to enable magnetic inductive signaling for charging, discharging, and communication with the battery unit. The battery unit may include a plurality of battery cells, where each cell comprises a chemical cell, a capacitive cell, a fuel cell, or a hybrid array of at least two of a chemical cell, a capacitive cell, and a fuel cell. The at least one wireless power transmission coupler may comprise 1 to $n*m$ wireless power transmission couplers dependent upon a voltage, current or power to be supplied by the battery unit, where n is a number of flat sides of the sealable case and m is a number of wireless power transmission couplers per flat side.

Other features of the battery system include a holding element included on each lateral corner of the sealable case to hold the battery system firmly to minimize lateral vibration while the battery system is in use or is being charged and a locking retention element on an end of the sealable case for securing the battery system in position during use and during charging. A connectionless, radiative interface on the sealable case also may provide cooling and/or heating via conduction to internal components of the sealable case during use and during charging of the battery system.

In other embodiments, the battery system includes an inductive communications link interface within the sealable case. For example, an inductive communications link interface enables wireless communications between the battery unit and at least one of a discharge station and a charging station. A communications controller within the sealable case may also be provided to prevent communications access to the battery unit without authentication using an encryption key. In alternative embodiments, the communications link interface may comprise at least one of a full duplex magnetic inductive communications link, a cellular radio, or a short-range transceiver (e.g. infrared, Wi-Fi, Bluetooth, Zigbee).

In further embodiments, the battery system includes at least one sensor disposed within the sealable case that measures temperature within the sealable case, voltage output by the battery unit, current output by the battery unit, and/or acceleration of the battery unit. A power management system within the sealable case may include a hardware security module that logs readings from the at least one sensor in a secured permanent record. An intrusion detection system within the sealable case also may be provided to detect attempts to open the sealable case and attacks on electronics within the sealable case. Any detected attempts to open the sealable case and attacks on electronics within the sealable case may be recorded in the secured permanent record. A battery backup also may be provided for the at least one sensor to allow sensor data to be recorded before shutdown of the battery system in the event of a catastrophic failure.

The battery system may further include a charging cradle having a surrounding enclosure that accepts the sealable case. The charging cradle may comprise at least one charging point that connects wirelessly to the at least one wireless power transmission coupler when the sealable case is disposed in the charging cradle. A communications controller within the sealable case may communicate with the charging cradle via an encrypted wireless communication link.

In particular embodiments, the battery system is used to power an electric vehicle. In such an embodiment, the sealable case is adapted to fit into a battery unit socket array of a vehicle whereby at least one wireless power transmission coupler geometrically aligns with a wireless transmission coupler of the vehicle for wireless power transfer. To facilitate handling, the sealable case may further include vias adapted for handling of the sealable case.

In other sample embodiments, a plurality of the battery systems are clustered in a horizontal cluster arrangement whereby at least one wireless power transmission coupler of each battery system is aligned with at least one wireless power transmission coupler of another battery system to distribute power amongst the battery systems in the horizontal cluster arrangement. Alternatively, a plurality of the battery systems may be clustered in a vertical cluster arrangement whereby at least one wireless power transmission coupler of each battery system is aligned with at least one wireless power transmission coupler of another battery system to distribute power amongst the battery systems in the vertical cluster arrangement In either configuration, a bottom tray may be provided to hold the plurality of battery systems to assure alignment of respective wireless power transmission couplers of respective battery systems. The bottom tray may also provide a communications interface to the plurality of battery systems and a power connection to supply or deliver power to or from the plurality of battery systems. The resultant row or column arrays can deliver higher voltages (if connected in series) or higher currents (if connected in parallel).

In yet other sample embodiments, the contactless battery system further includes a secure memory within the sealable case that stores an historical operating profile of the battery unit. The historical operating profile may include at least one of a record of temperature of the battery unit over time, a discharge cycle of the battery unit over time, a rate of charge and discharge of the battery during use, accelerometer measurements over time, voltage levels of the battery unit over time, and current levels of the battery unit over time. A battery controller may generate a numerical quality figure from the historical operating profile and securely store the numerical quality figure in the secure memory. The numerical quality figure may provide a quality metric that may be used in the place of load testing of the battery system to generate a snapshot of the battery system's state of health.

In still another sample embodiment, the battery unit is connected to a direct current (DC) energy storage device and to an alternating current (AC) power source and is adapted to provide simplex bidirectional wireless power transfer between the DC energy storage device and the AC power source.

A method may be performed by the apparatus, and further features of the method result from the functionality of the apparatus. Also, the explanations provided for each aspect and its implementation apply equally to the other aspects and the corresponding implementations. The different embodiments may be implemented in hardware, software, or any combination thereof. Also, any one of the foregoing examples may be combined with any one or more of the other foregoing examples to create a new embodiment within the scope of the present disclosure.

DETAILED DESCRIPTION OF THE DRAWINGS

The foregoing and other beneficial features and advantages of the subject matter described herein will become apparent from the following detailed description in connection with the attached figures, of which:

Figure 8:
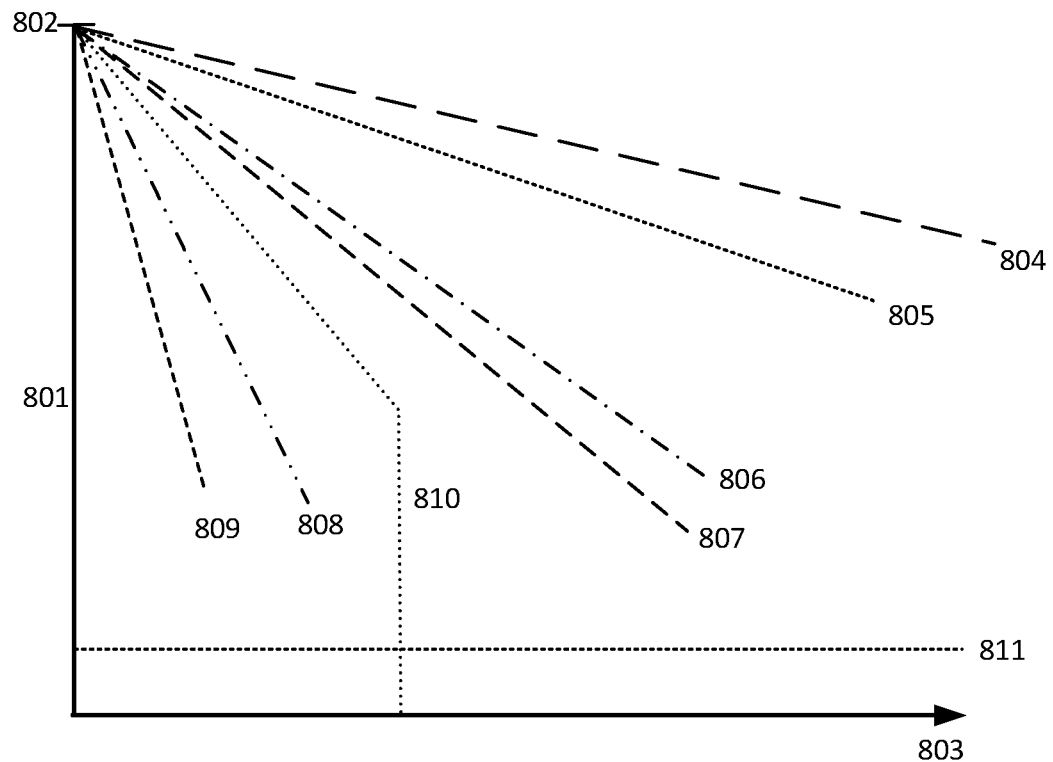

FIG. 8 graphically illustrates an example of a battery life versus use model in sample embodiments.

Figure 9:
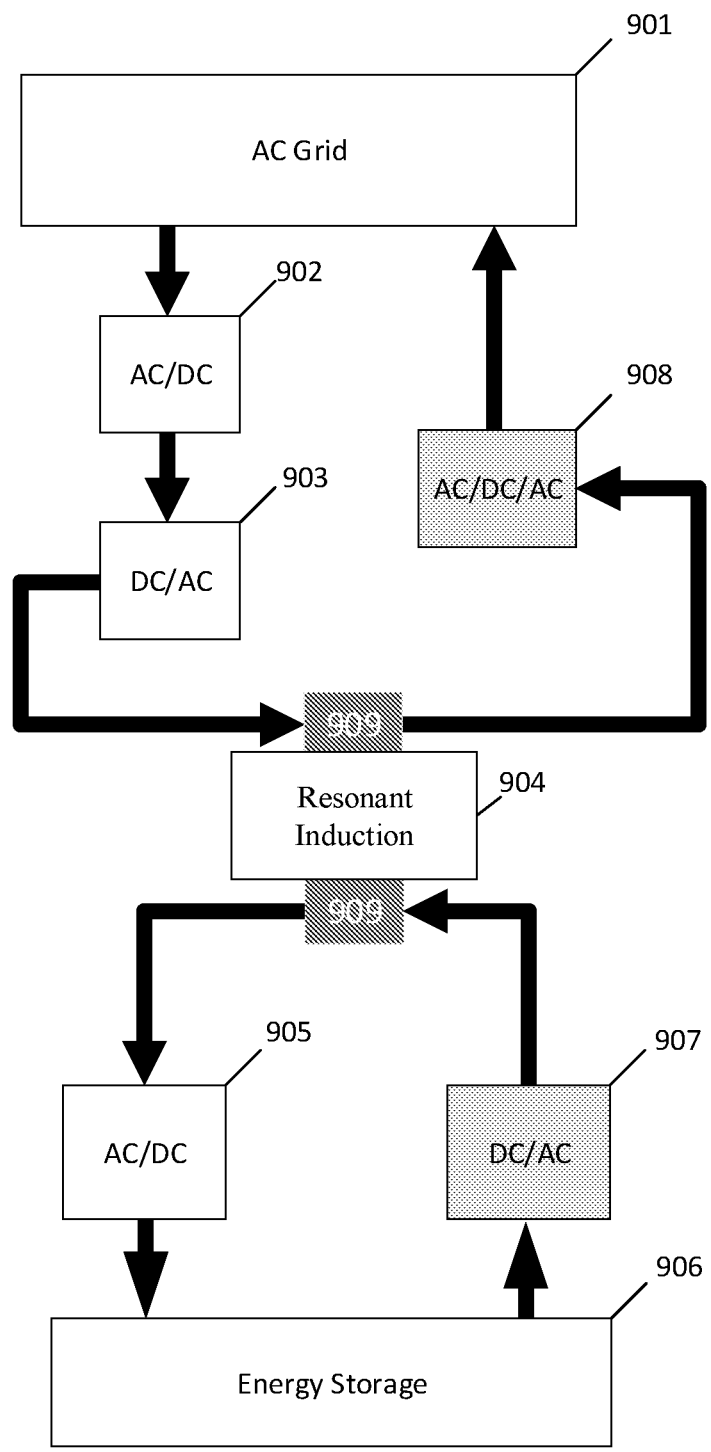

FIG. 9 depicts the functional blocks for providing simplex bidirectional power

Figure 10:
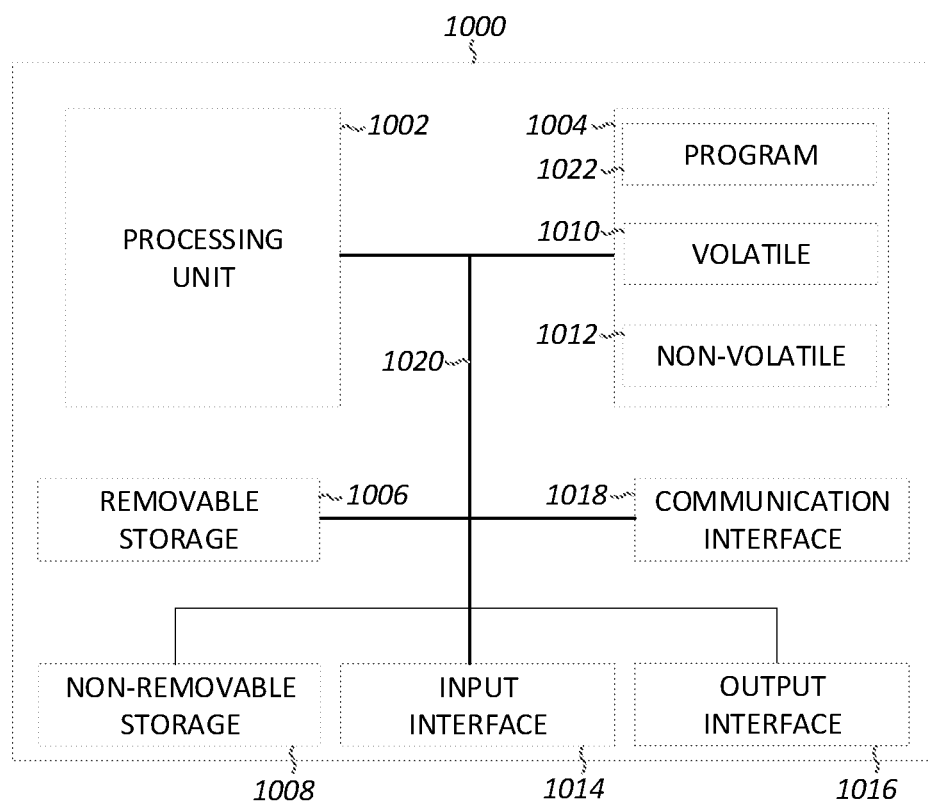

FIG. 10 is a block diagram illustrating circuitry for performing methods and implementing processing features according to example embodiments.

DETAILED DESCRIPTION OF ILLUSTRATIVE EMBODIMENTS

Sample embodiments will be described with respect to FIGS. 1-10 for use in charging electrically powered vehicles, although those skilled in the art will appreciate that the teachings provided herein may be used in other non-vehicular resonant magnetic induction wireless power transfer systems. Such embodiments are intended to be within the scope of the present disclosure.

The contactless replaceable (swappable) battery unit described herein employs magnetic inductive coupling to accomplish charging of, discharging from, and communication between system elements to allow for a contactless battery unit that is permanently sealed in a rugged, dust-proof and water-resistant container.

Without physical contacts, the battery is inherently safe since voltage and current are not available to the touch. The lack of conductive material also means that contact wear is eliminated. The case of the contactless replaceable battery provides the standoff distance between wireless resonance couplers. The battery modules also have the benefit of inherent galvanic isolation due to the contactless nature of the system.

While circuit breakers, interrupts, or fuses may be incorporated within the battery unit housing, the use of wireless power transfer prevents shorts and ground faults in handling even in a conductive atmosphere or in submerged fresh or seawater applications.

The sealed aspect of the battery unit prevents water and dust infiltration allowing for battery use in wet, dusty or explosive atmosphere environments. The sealed aspect also allows the deployment of internal (to the case) intrusion detection systems, both physical and electronic. The intrusion detection can be used to detect improper attempts at battery changes or attacks on the electronics containing the usage and charging records in an attempt to increase the battery unit's value on the secondary life battery market.

In the near term, large scale (multi-kilowatt hour (kWh)) vehicle and ground site deployments are foreseen for the sealed contactless battery unit and charging stations. However, as electronics continue to miniaturize, inclusion of sealed contactless battery units into most or all replaceable battery applications will become possible.

FIG. 1

Figure 1:
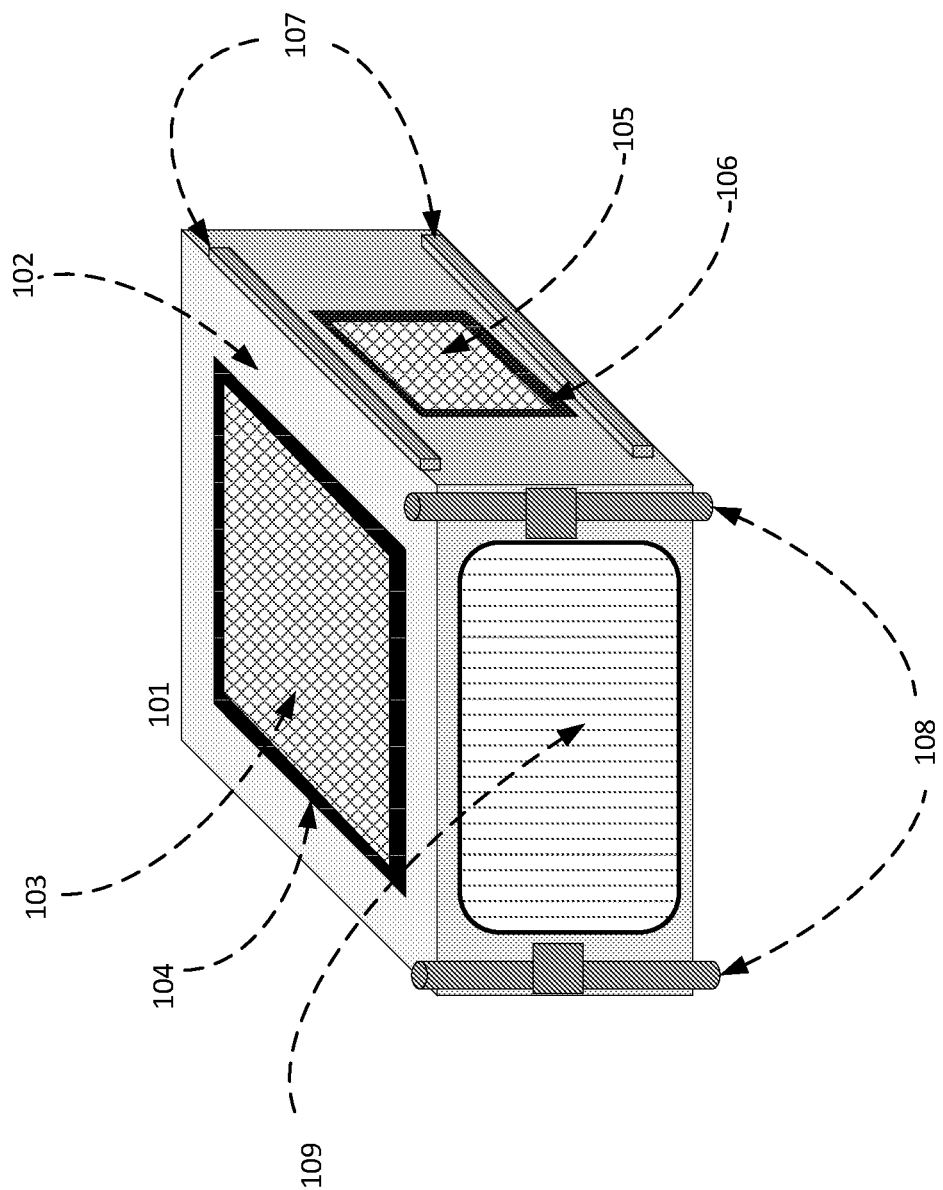
FIG. 1 illustrates an example of a contactless battery unit in a sample embodiment.

FIG. 1 illustrates an example of a sealed, contactless battery unit 101 in a sample embodiment. A rugged sealed case 102 protects the interior components of the battery unit 101. The material of the sealed case 102 may be a non-conductive material (e.g. fiberglass, Kevlar® composite) or metal. If the case is metal, the areas covering the wireless power transmission (WPT) couplings 103 and 105 and a surrounding guard band 104 and 106 must be non-conductive. Note that in FIG. 1, an additional two wireless power transmission couplers are not shown on other sides of the battery unit 101. Dependent on the voltage, current, or power the battery unit 101 is intended to supply, the number of WPT couplings 103 can vary from 1-to-n*m, where n is the number of flat sides of the sealed case 102 and m is the number of coupler installations per flat side (based on the ratio of available flat side area to coupler area). The geometry of the battery unit 101 may be varied with each additional flat side allowing additional WPT coupler installations. The size the battery unit 101 also may be varied depending on use, thus also allowing additional coupler installations on the available area of each flat surface. The size of the magnetic inductive couplers and coupler surface area may also be varied to obtain the desired number of couplers per battery unit 101.

Each coupler includes one or more flat coil assemblies with associated circuitry (e.g., filter(s), rectifier, voltage converter, voltage regulator) protected under the non-conducting charging surface portion of the battery case. The coupler is bidirectional in that it may be alternately used for charging when recharging and discharging when supplying power.

A holding element 107 is included on each lateral corner of the sealed case 102 of the battery unit 101 as shown in FIG. 1. The holding element 107 serves to both assist replacement (insertion and removal) and to hold the battery unit 101 firmly to minimize lateral vibration while in use or during charging. Although shown in the FIG. 1 example as corner mounted slides to fit the socket receptacle provided slots, other powered or unpowered mechanical elements (e.g. slides, rails, rollers, linear ball and roller bearings (either recirculating and non-recirculating), rack-and-pinon, roller bearing plates, threaded and un-threaded rods) and placement on (or integrated into) the case frame are envisioned to provide easy battery unit replacement and to hold the battery unit 101 in a sufficiently vibration-damped grasp.

A locking retention element 108 may be included on the posterior end(s) of the battery unit 101. The locking retention element 108 secures the battery unit 101 in position for use and charging. The locking retention element 108 also serves as a deterrent to inadvertent or malicious battery unit 101 removal. Portrayed in this example as a modified lockrod assembly, other mechanical, magnetic hydraulic, electromagnetic, and electro-mechanical holding element enabled or actuated constructions are feasible to provide or enable the retention and locking functions.

An environmental control element 109 is shown on a posterior end of the battery unit 101. The environmental control element 109 provides a connectionless interface for internal cooling and/or heating elements of the battery unit 101 to external cooling and/or heating elements available when in use or charging. Note that additional thermally conductive surfaces can be emplaced anywhere on the case not occupied by another element (e.g. the charging surface of the WPT coupler).

In this embodiment, the magnetic loop antenna for transmission and reception of inductive duplex communications between the battery unit 101 and a charging or discharging cradle (not shown) share the non-conductive surface areas with the wireless power transmission (WPT) couplers 103 and 105. Dedicated non-conductive surfaces may also be used if differing antenna placement is desired.

FIG. 2

Figure 2:
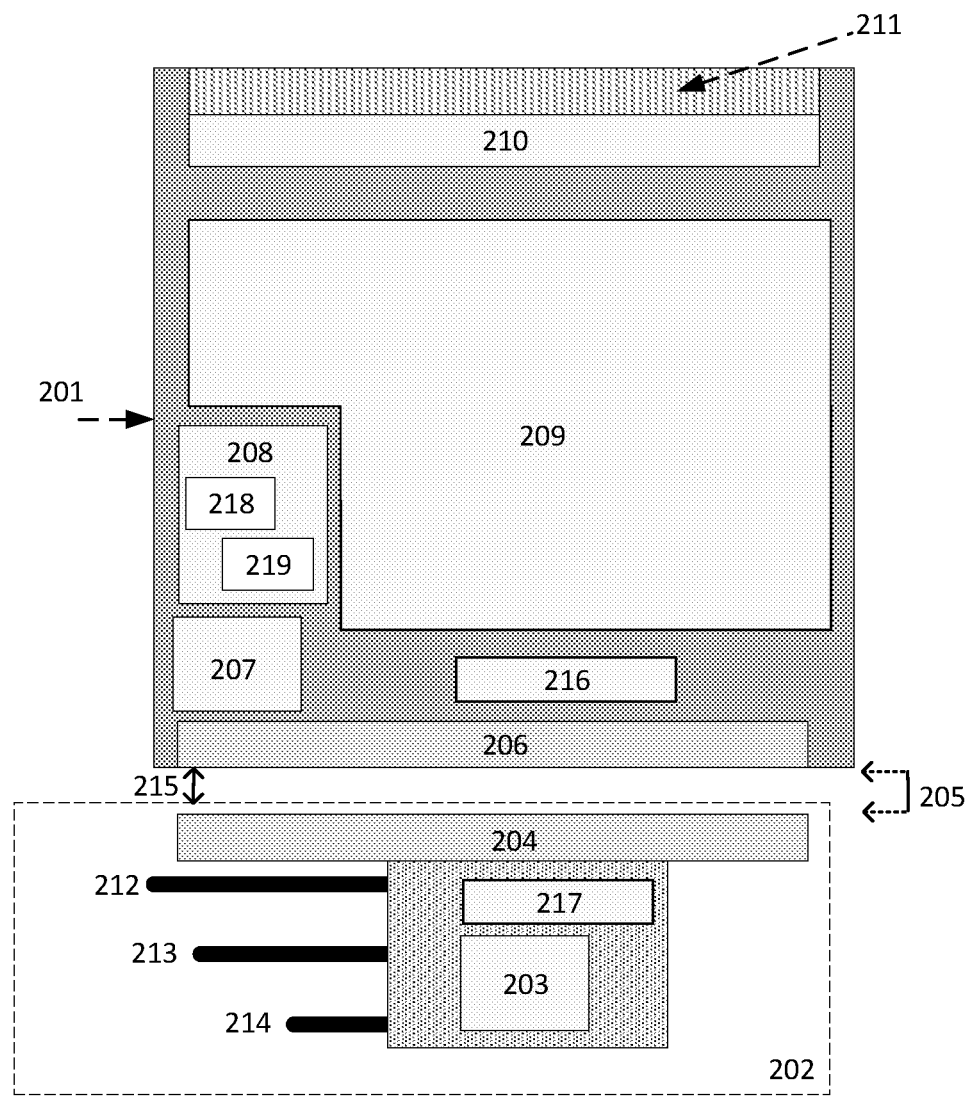
FIG. 2 illustrates the internal functional subsystems of the sealed contactless battery unit as well as a discharge station in a sample embodiment.

FIG. 2 illustrates the internal functional subsystems of the sealed contactless battery unit 201 (which may include the battery unit 101 from FIG. 1) as well as a discharge station 202. The battery unit 201 is inserted or otherwise held in place adjacent to the discharge station 202. The gap 205 between battery unit coupler 206 and the discharge station coupler 204 may be regulated by the case thickness or the combined case thickness and discharge station covering. Additional air gap 205 between couplings 204 and 206 may be imposed using standoffs or the holding elements 107 of the battery unit 201.

The discharge station 202 connects with the battery unit 201 using magnetic resonant inductance. In addition to the magnetic discharging signal, an inductively coupled communications system signal also may be present.

The electrical power connection 212 conveys the electricity generated by the discharge station coupling 204 and is conditioned by the power management system 203. The discharge coupling 204 is comprised of one or more flat coil electromagnet(s) and associated circuitry (e.g. filter(s), rectifier, voltage converter-regulator).

The duplex communications link interface 214 between the discharge station 202 and the power station (e.g. a vehicle, a charging cradle, a power storage depot, or a business or residential emplacement) conveys digital information both to and from the battery unit 201 via the inductive communications link 215 to the discharge station 202.

The environmental control connection 213 supplies the desired cooling or heating media to the discharge station 202. Since the battery unit 101 is sealed, radiative surface areas 211 of the battery unit 201 may interface with the supplied heating or cooling via conduction or convective heat transfer. Internal to the battery unit 201 is an environmental control system 210 that serves to manage and distribute the internal coolant resources (e.g. air, liquid coolant, phase change material). The environmental control system 210 provides heating or cooling throughout the battery array 209 and onboard electronics 207 and 208. The battery array 209 consists of distinct cells, each connecting to the power management system 208 and the battery management system 207 and the environmental control system 210. The distinct cells may be chemical cells, capacitive cells (e.g. ultracapacitors), reversable fuel cells or a mixture thereof, creating a hybrid array.

The battery unit communications controller 216 is a gateway router with firewall security, preventing access to the internal network of the battery unit 201 without the appropriate key provided by the discharge station's 202 communication controller 217. The battery unit communications controller 216 also serves to conceal the internal configuration of the battery unit 201 from external probing. Externally available information (e.g. electronic serial number, state of charge, quality score, summarized or publicly available sections of the usage log information) would be retained locally to the battery unit communications controller 216.

The discharge station communications controller 217 is the bridge router between all external networks and the internal WPT enabled communications network. In one embodiment, secure internet communications protocols (e.g. Transport Layer Security) are required for any external network connection. Within the internet virtual private networking 'tunnel,' additional authentication and access control using data encryption may be required to access both the discharge station 202 and the battery unit 201.

As illustrated in FIG. 2, the power management system 208 contains a mechanically hardened hardware security module (HSM) 218 and secure memory for logging 219. The secure, encrypted non-volatile memory 219 is used for logging of the secured permanent record of all sensors embedded in the battery unit 201. These sensors include time, temperatures, voltages, currents, pressures, and accelerations. The power management system 208 also serves to limit access to the cryptographic key vault held by the HSM 218.

The power management system 208 may record all communication sessions, physical intrusions, and software access/attack attempts. The power management subsystem 208 includes a communications processor (not shown) that interfaces only to the internal, encrypted secure network of the battery unit 201. All data transferred over the power control subsystem 208 communications link both internal to the battery unit 201 and to and from external sources through the battery unit communications controller 216 is screened by an internal (to the power management system 208) firewall.

Since the battery unit 201 is intended to be permanently sealed, maintenance on the internals of the battery unit 201 is intended to be difficult. Provision for manufacturer-level maintenance (for instance replacement of a malfunctioning battery cell in the battery array 209) is made in that the replacement event will be logged.

Logging of manufacturer-level maintenance of the contactless battery unit will be enabled by the use of cryptographic keys embedded in the key vault. Use of a key will assure that a trusted facility has performed the maintenance. Both symmetric keys and asymmetric (public key) storage may be held in the HSM 218.

The power management system 208 has a battery backup, sized to allow for recording of sensor data before shutdown in the cases of a catastrophic failure like an external software or physical attack or an internal system failure of the battery unit 201.

FIG. 3

Figure 3:
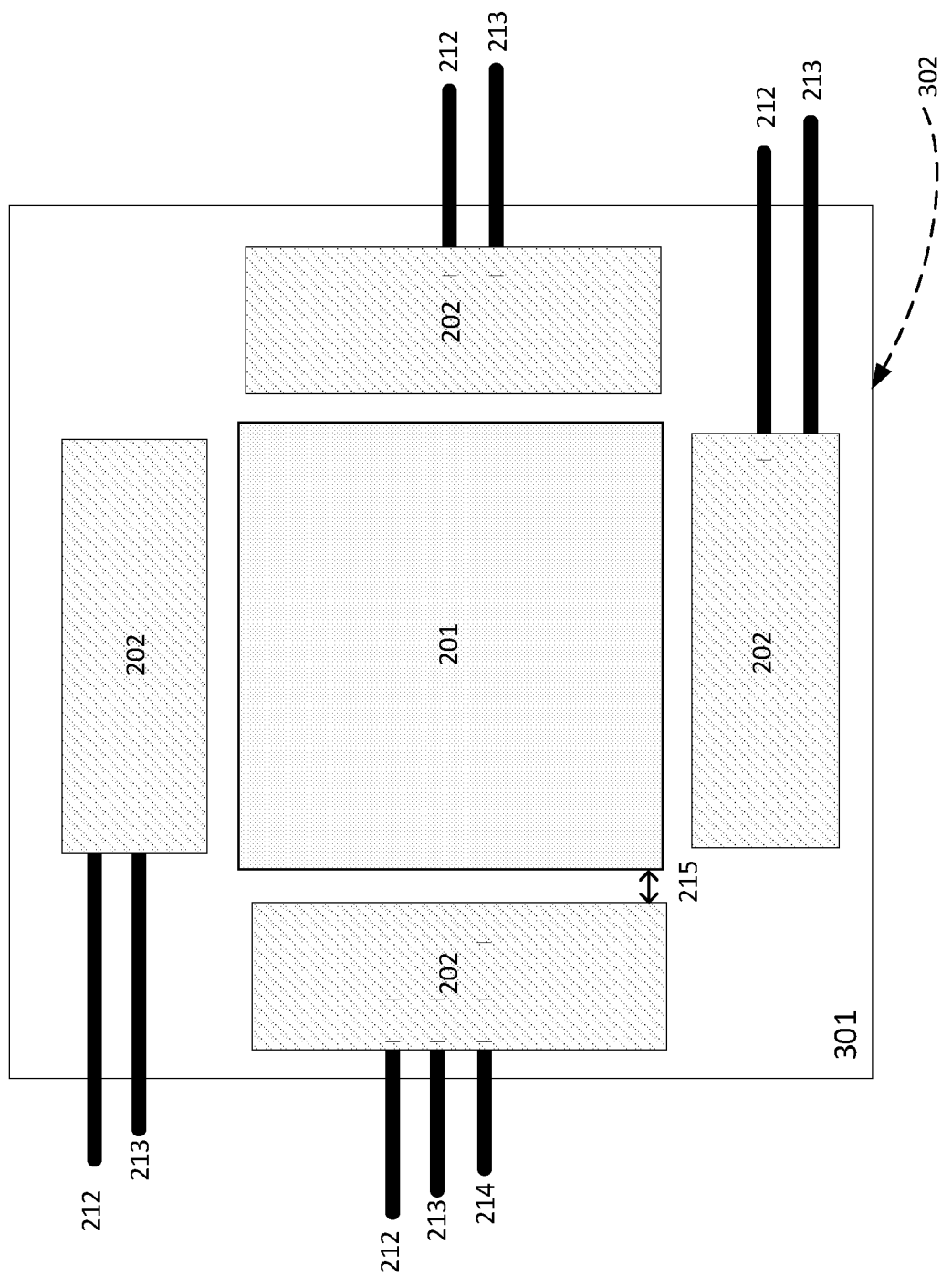
FIG. 3 illustrates a sample embodiment of the contactless battery unit in a charging cradle.

FIG. 3 illustrates a sample embodiment of the contactless battery unit 201 in a charging cradle. One benefit of the replaceable sealed, contactless battery unit 201 is that it can be charged offsite or while out of the electric vehicle, depending on the use. The offsite location allows access to power and cooling that allows for optimal controllable charging conditions.

The charging station 301 in this example includes a surrounding enclosure 302 that shields and decouples the charging points 202 from the weather. The charging station 301 is supplied with power connections 212 and environmental control (e.g. coolant) connections 213 for each of the charging points 202. This example uses four charging points 202 that connect wirelessly to the battery unit 201. Each of the charging points 202 is independently controllable to optimize the charging voltages. In the charging station configuration of FIG. 3, the external communications link interface 214 is only needed at one charging point 202 for conducting the magnetically coupled duplex communications 215. Additional communications links may be provided for redundancy; otherwise, internal connectivity may be provided to control the various sections.

Since the wired power connections 212, wireless power connections(s) 214 and wireless communications link(s) 215 are bi-directional, a charging station 301 can be used operationally as the discharge station 202 shown in FIG. 2.

Since battery units 201 can be charged at any charging station, potentially owned by different parties, the cryptographic services provided by the battery unit's HSM 218 can be used for data confidentiality, communications integrity, payment non-repudiation, owner identification and charging station 301 and battery unit 201 authentication.

The battery unit 201 may be charged while mounted in the vehicle or at another, off-vehicle site. In one embodiment, the charger slowly charges using low voltages so as to lower the cooling and power demands.

In the case of high-power, short duration charging, the charging station 301, however comprised, can supply power and cooling. The power and cooling needs may be generated from the historical, lifetime charging history supplied over the inductive communications system to the charging station 301.

When removed from the vehicle and emplaced into the charging station 301, full or partial submergence in cooling liquid may be used both to regulate the case temperature (and thus the internal battery temperature) but also may be used as an electrical connection to earth ground in architectures where an earth ground is required by the wireless power transfer system and where a section of the sealed battery case may act as a ground contact with the liquid. The permanently sealed case prevents dust and water incursion to meet (or in excess) of NEMA 6 or IP67 requirements.

For non-vehicle primary use, the same charging scenarios (e.g. charging in situ, or removing for off-site charging) apply.

FIG. 4

Figure 4:
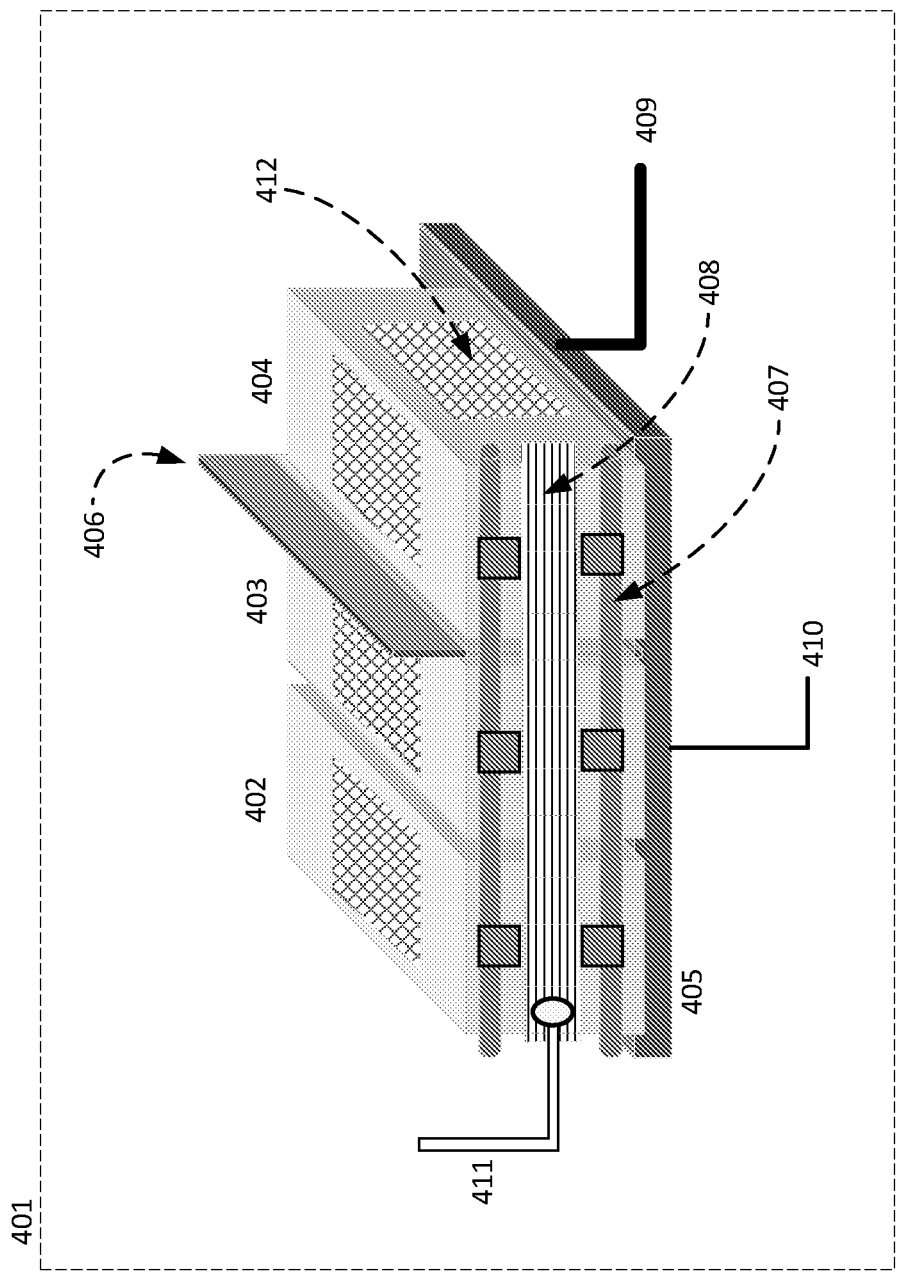
FIG. 4 illustrates an exemplary horizontal cluster arrangement of contactless battery units in a sample embodiment.

FIG. 4 illustrates an exemplary horizontal stack of replaceable sealed, contactless battery units 401 in a sample embodiment. The battery units 402, 403, and 404 are independently swappable and would commonly be deployed in an n+1 array to maintain power levels during replacement. On the other hand, there may be scenarios where all batteries get replaced while the unit is not functional. In the example of FIG. 4, the discharge station is integral to the bottom tray 405 which also serves to hold the battery units 402, 403, and 404 in place assuring alignment of the bottom coupling units (not shown). In a horizontal arrangement, the side-mounted couplings 412 (note: only one can be seen in the FIG. 4 viewpoint) may be active, distributing power so as to even the power load or capacity of each battery unit 402, 403, and 404. In deployments with vibration or lateral loads (e.g. vehicle movements, earthquakes), the horizontal array 401 may be equipped with vertical supports 406. These vertical supports 406 could also be used to support and stabilize additional rows of battery units 401. Additional rows could interface with lower rows and supply (or be supplied) with power and communications via the aligned bottom to top coupling emplacements. The locking and retention components 407 hold each battery unit 402, 403, and 404 in place on the tray 405.

In the portrayed configuration in FIG. 4, a common environmental control interface 411 supplies the battery units 402, 403, and 404 with the needed heating or cooling while a single communications interface 410 provides the connection for exterior communications. A single power connection 409 is used to supply or deliver power depending on the use case. Additional environmental, communication, and power interfaces are deployable as needed (e.g. for cooling, bandwidth, or load respectively). The common environmental exchange component 408 allows for independent connectivity to allow replacement of individual battery units 402, 403, and 404. In some deployments, individual cooling or heating connections to the battery unit 402, 403, and 404 also may be used.

FIG. 5

Figure 5:
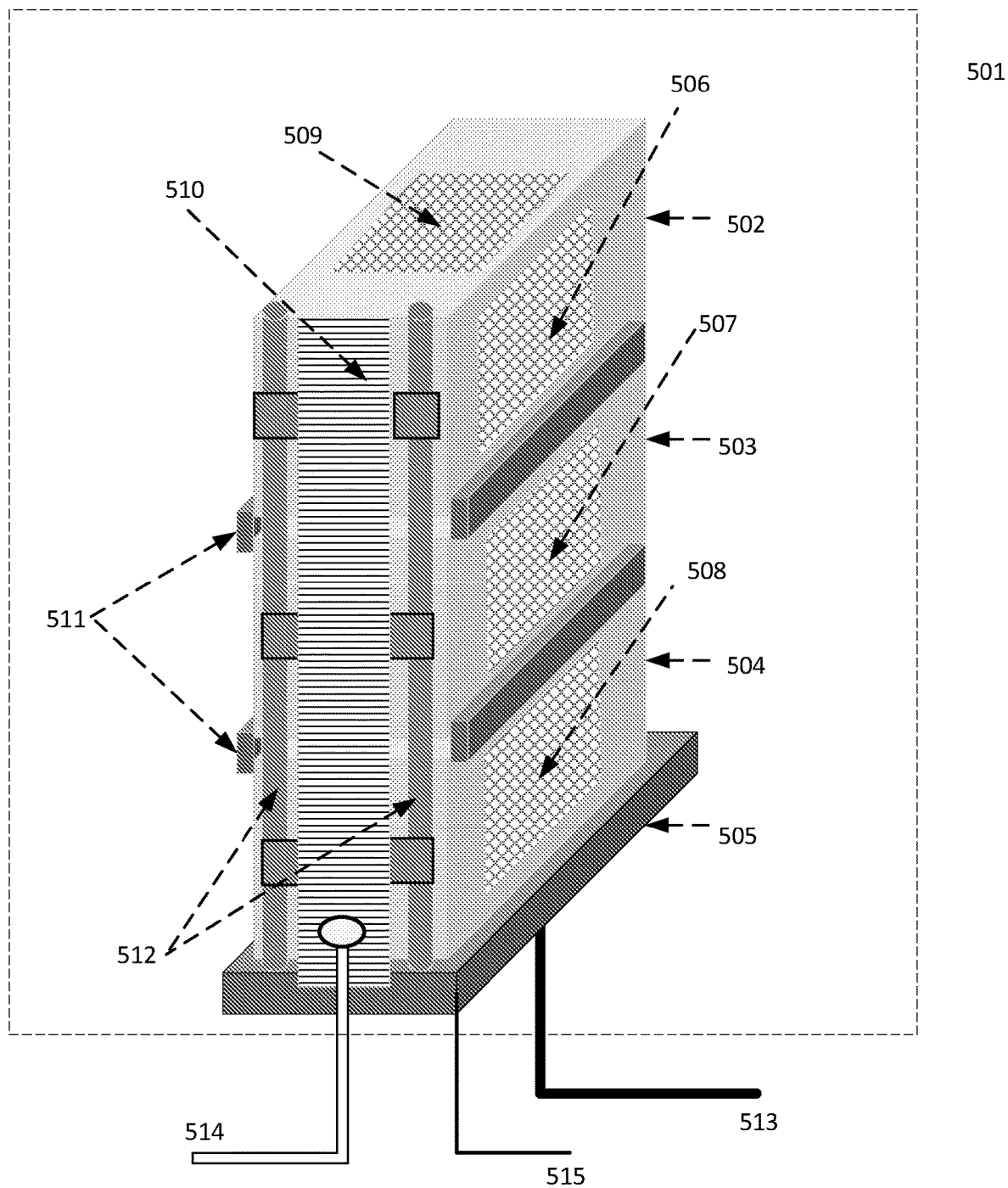
FIG. 5 illustrates an exemplary vertical cluster arrangement of contactless battery units in a sample embodiment.

FIG. 5 illustrates an exemplary vertical battery unit array 501 in a sample embodiment. The vertical battery unit array 501 shown in FIG. 5 is an example of an interconnected, stacked cluster of independent replaceable sealed, contactless battery units 502, 503, and 504. The battery unit array 501 rests on a bottom tray 505 which provides links to exterior connections for power 513, communications 515, and environmental control 514. A mechanical support system 511 holds the battery units 502, 503, and 504 in place and in proper alignment while a mechanical retention and locking system 512 allows ease of replacement and provides additional mechanical support against movement. An environmental exchange system 510 interfaces with each of the battery units 502, 503, and 504 and allows individual replacement of each battery unit 502, 503, or 504 as well as an exterior environmental connection 514.

The wireless coupling assemblies (not shown) on the tops and bottoms of the lowest battery units 503 and 504 (internal to battery case) allow for communication and power transfer. The topmost battery unit 502 uses its bottom mounted wireless coupling assembly (not shown) for communication and power transfer while its upper wireless coupling assembly 509 is unused and unpowered in this example installation.

The right side-mounted wireless coupling assemblies 506, 507, and 508 are available for interconnection to another vertical stack if desired as are the left side-mounted wireless coupling assemblies (not shown). All wireless coupling assemblies not interconnected will remain unpowered.

FIG. 6*a*

Figure 6A:
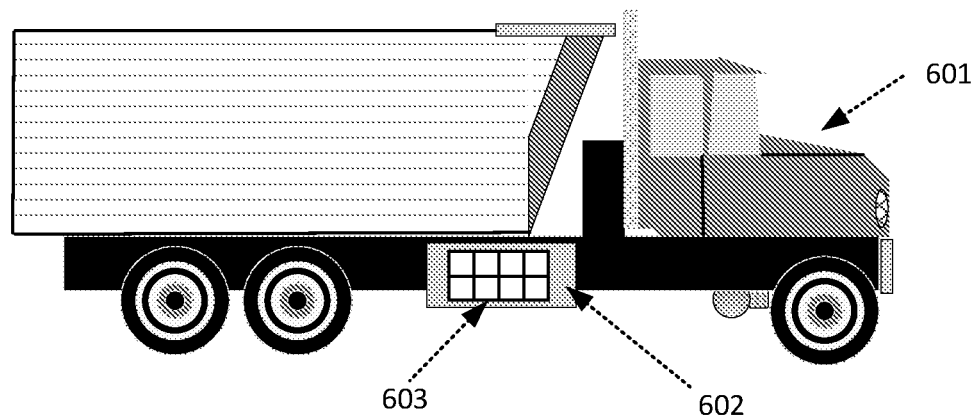
FIG. 6a illustrates a vehicle application of the contactless battery units in a sample embodiment.

FIG. 6*a* illustrates a vehicle application of a cluster of independent replaceable sealed, contactless battery units in an electrically powered construction vehicle 601. The construction vehicle 601 may be a chemical/electrical hybrid. As illustrated, a battery unit socket array 602 is installed on the vehicle (e.g. a dump truck) 601 allowing easy access for loading and unloading of battery units 201. Eight individual sockets 603 are available for insertion of a battery unit in this illustrative example. One or more WPT coupling assemblies may be constructed on each flat side of the socket array 602. In case of a mismatch in assemblies per side on the vehicle socket and the battery unit, only those couplings in geometrical alignment with other battery units or wireless transmission couplers on the vehicle 601 will be enabled for wireless power transfer.

FIG. 6*b*

Figure 6B:
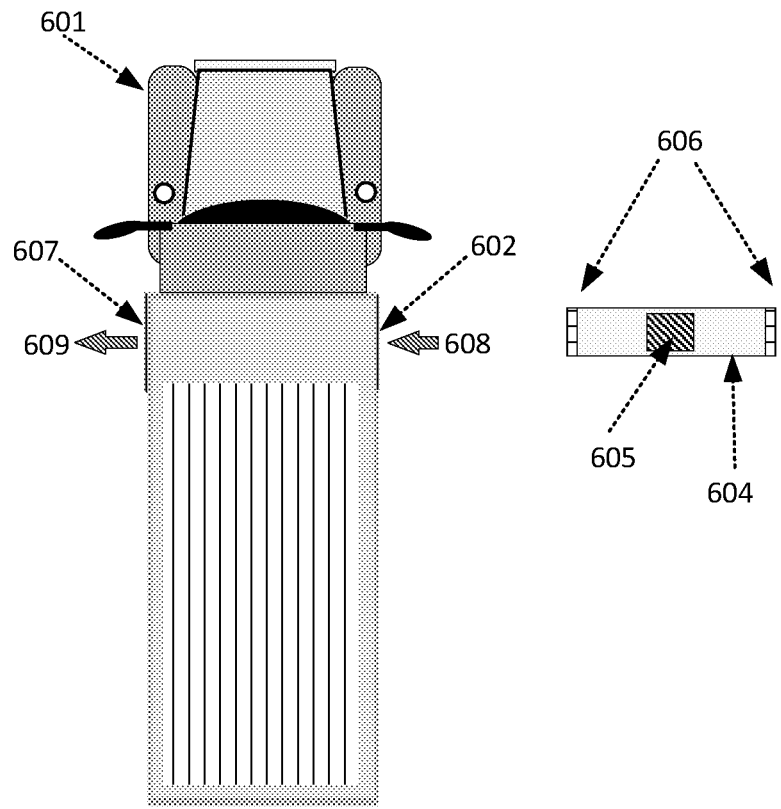
FIG. 6b illustrates a sample embodiment of a construction vehicle refueling using contactless battery units in a sample embodiment.

FIG. 6*b* illustrates a sample embodiment of a construction vehicle, such as the exemplary dump truck 601 from FIG. 6*a*, refueling using contactless battery units in a sample embodiment. As illustrated, the replacement battery unit 604 has one or more coupling assemblies 605 installed on the flat side(s) of the battery unit 604 for communication of power and data. Environmental interfaces 606 are installed at each end of the replacement battery unit 604 (those not occupied by a wireless coupling assembly).

The battery unit socket array 602 allows easy access to the battery unit socket. In this example, the battery unit socket array 602 is equipped with a secondary access 607. By inserting at 608 a replacement battery unit 604, the previously installed, presumably depleted battery unit is pushed out of the battery socket(s) at 609 via the secondary access 607. The environmental interface in this example relies on ambient air cooling or connections in the hatches of the battery unit socket array 602.

FIG. 7

Figure 7:
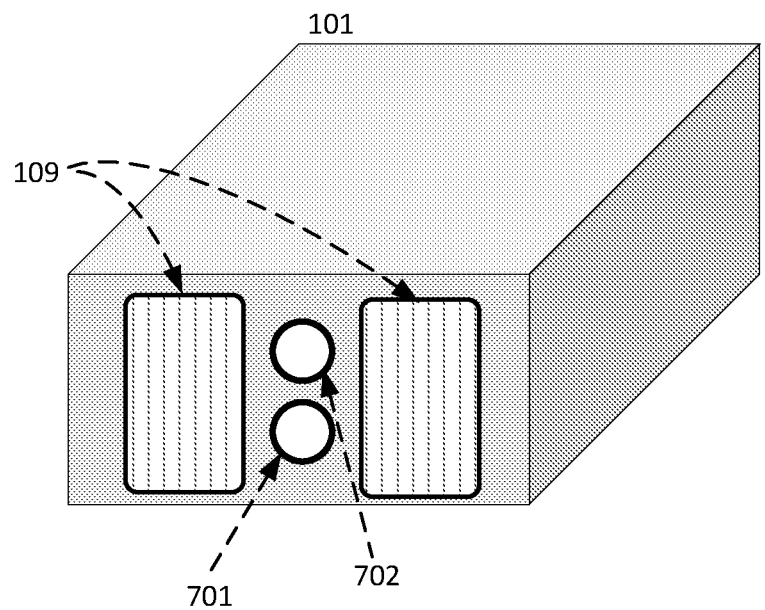
FIG. 7 illustrates a sample embodiment of a contactless battery unit configured for handling.

FIG. 7 illustrates a sample embodiment of a contactless battery unit configured for handling. FIG. 7 illustrates the customization potential of the sealed contactless battery unit 101. In this example, the battery unit 101 has been equipped with vias 701 and 702 in the body of the battery unit 101 that allow for carriage and installation by lightly modified, conventional handling equipment (e.g. a forklift). The parallel tubular construction through the battery unit's center of mass of the vias 701 and 702 allows for positioning for insertion into a socket without tipping or rolling.

Once installed, the vias through the battery unit also may be reused, providing additional conduction cooling, augmenting other installed environmental control interfaces 109.

FIG. 8

FIG. 8 graphically illustrates an example of a battery life versus use model in sample embodiments. Illustrative examples of battery quality models are shown in FIG. 8. The x-axis 803 depicts time while the y-axis 801 shows battery quality 802 as determined from correlation with a detailed, multi-variant model of battery quality. The simplified linear battery life models are shown to illustrate the variables in determining battery quality in a graphical form. A quality threshold 811 is drawn to show the value for which a replaceable sealed battery unit of a particular design becomes valueless. Other thresholds can exist, for instance, where the battery quality becomes unfit for a vehicle-based application. All illustrative examples depict linear relationships over time; however, more accurate models can include differing linear segments (i.e. changes in slope) over time to better match the impact to capacity variance over time.

The simplest case of estimating battery quality is shown for the charged, stored battery unit. Here the temperature of the storage facility is the main determinant of quality with a cooler facility yielding a higher quality estimate 804 than that of a battery unit stored at a higher temperature quality estimate 805.

For simplified models for a normal operating profile (regular, periodic charging without fast charging (overvoltage) or deep discharge), the estimate 806 shows a higher quality due to discharge cycle from 80% state of charge to 20% state of charge while the estimate 807 shows the relative impact of a discharge cycle from 90% to 10% state of charge.

A catastrophic event's effect on a quality model 810 is shown. With this model, a linear decrease in battery quality over time until an event (e.g. internal short circuit, internal open circuit, internal coolant depressurization, high acceleration (impact)) damages the battery unit, leading to an immediate drop in quality.

Quality models showing the effects of fast charging and/or deep depletion are shown by models 808 and 809. The battery unit yielding the model 808 is periodically driven into deep (e.g. <2% current state of charge capacity) and then is charged overnight. The battery unit generating the model 809 is periodically driven into deep (e.g. <2% current state of charge capacity) and then is charged using a fast charger. The relative quality levels show the impact of both the deep depletion and the fast charging effects on the battery array.

Battery Thermal Management

The battery unit 101 supports an internal thermal management system coupled to the sealed exterior case 102. The sealed exterior case 102 may then be in contact with the elements of the vehicle 601 or charging station 301 that supply cooling or heating without penetration of the sealed battery case 102. The battery unit 101 also may have an internal electrical heating system for pre-heating the internal battery array.

Sensors and History

The sealed permanent nature of the battery unit 101 allows for deployment of permanent internal sensors for voltage, current, temperature and kinetic accelerometer(s) that may be used to generate a historical profile of battery use. Information on temperature, voltage levels, current levels, and 3-axis acceleration(s) to the individual cell level can be generated and retained. This historical profile allows predictions to be made regarding the future capabilities of the battery unit 101. These predictions allow for formulation of a valuation on the secondary market for batteries similar to the mileage (odometer reading) of an automobile for used cars.

The permanently sealed contactless battery unit 101 with wireless connections has a lifetime history of storage, charging and discharging events by having instrumentation (voltage, current, internal and exterior temperature(s), acceleration) built permanently into the battery array and the sealed compartment.

A historical usage profile (charging, discharging, voltages, temperatures, storage, accelerations) may be made for each battery unit 101. Acceleration loads that detect rough handling are also considered. This lifetime profile allows a battery unit quality measurement to be formulated. The full history also would be available, including the creation of an "at-a-glance" single numerical figure for quality (similar to the odometer on a used car).

The chronicled information acquired by the battery unit's sensors and stored by the battery back controller can be used to produce a correlation to a charged-once, unused, unstored, undischarged battery model. A battery with a perfect charging history (e.g. freshly produced, ready for first use) would have a correlation of 1 Daga (note: a new unit of measurement). As the battery unit is cycled over time, the value decreases giving the user/owner an estimate of the battery life and the value to the 2nd and 3rd life markets. For an example, a battery with, for example, a rating of 600 millidagas (md) would be moved from the fleet usage pool to a 2nd life application (such as grid augmentation). The 600 md (or 0.600 D) threshold for vehicular use is an example and could vary with market desire, owner preference, and regulatory requirements.

Obviously, overcharging, overheating, and fast discharging that damage a battery would be accounted for in a lower Daga score as a deviation from the model. Accelerometers measuring shock would also contribute to the Daga score. Casement intrusion detection would also contribute to the Daga score computation as would detection of cyber-attacks versus the battery unit controller.

As an item of value, the Daga score would be kept in secure storage in the battery unit 101 and could be uploaded to a network (e.g. internet attached server based) storage when charging in a charging cradle.

Since the battery unit sensor data can be uploaded, it is possible that the usage profile or updates to the usage profile may be generated by aggregating data from a population of deployed battery units rather than by estimation or lab testing. It is noted that different quality models versus usage can exist for each specific rechargeable battery chemistry (e.g. Lead-acid, Nickle-Cadmium (NiCd or Ni-Cad), Nickel-metal hydride (NiMH), Alkaline (predominately Zinc (Zn) and Manganese dioxide (MnO2) based) and the Lithium Ion, Lithium-Sulfur, and Lithium-Polymers (e.g. Li-nickel manganese cobalt oxide (NMC), Li-nickel cobalt aluminum (NCA), Li-iron phosphate (LFP) and Li-titanate (LTO))), solid-state battery, and battery analog (ultracapacitor, reversable fuel cell) and for each hybrid energy storage system where two or more technologies or chemistries are used.

Use of the Daga quality metric could also be used in the place of load testing of a battery unit to generate a snapshot of the battery unit's state of health.

Communications and Control

Magnetic inductive communications (as detailed, for example, in U.S. Pat. No. 10,135,496, entitled "Near field, full duplex data link for use in static and dynamic resonant induction wireless charging" and in U.S. patent application Ser. No. 16/570,801, filed Sep. 13, 2019, also entitled "Near field, full duplex data link for use in static and dynamic resonant induction wireless charging") allow secure and sophisticated communications enabling battery status, state of charge, and historical charging, discharging data to be exchanged as well as closed loop control of the charging signal. The descriptions of these patent documents are hereby incorporated by reference.

Use of alternate or supplemental communications means by the addition to the battery unit of a short-range transceiver (e.g. RFID, Bluetooth, Wi-Fi, or Zigbee) also may be useful in certain deployment configurations or to meet customer or regulatory requirements. Use of longer-range communications means such as cellular radio could also be used if added to the battery unit 101 or discharge cradle 202 for those same reasons.

Bi-Directional Use

The battery's wireless charging unit may be capable of bidirectional use, supporting both charging and discharging of the battery. The wireless charging system may consist of one of more wireless couplers and be reused for discharge. Optionally, separate wireless inductive couplings may be used for charging and discharging with each sized for the expected power transfer rate.

FIG. 9 shows an exemplary high-level functional diagram for power flow through and conversion by a bidirectional wireless power transfer system in a sample embodiment. While certain components are by nature bidirectional and symmetric in operation (e.g. the resonant induction circuit also known as an the open core transformer) and can be shared, the forward (charging) and reverse (discharging) power transmission paths will depend on divergent simplex architectures, requiring switches 909, control logic (not shown), and communications link (also not shown) to activate and complete the power transmission paths for each of the forward (charging) and reverse (discharging) use scenarios.

In the forward direction, power is nominally delivered from the utility grid 901. Dependent on the grid connection, the power may be single phase alternating current (AC), direct current (DC), or multi-phase alternating current. The utility grid 901 includes any transformers needed to step down voltages from high voltage transmission lines. In this example, single phase AC is delivered by the utility grid 901, where a sufficient capacitance exists so that the power factor is adjusted to approximately 1 (unity).

The AC power may be converted to DC by the AC/DC 902 converter. This function can be achieved by an active (switch-based) or passive (diode-based) rectifier.

The DC/AC converter 903 takes the input DC power and converts it to a high frequency AC (nominally 85 kHz in this embodiment) sinusoidal signal. The DC/AC conversion operation by the DC/AC converter 903 can be accomplished using an inverter.

The AC power signal may be passed to the coupling, a resonant air core transformer 904, with its primary and secondary coils. The AC power is converted to magnetic flux in the primary which is inductively coupled with the secondary. The secondary coil converts the received magnetic flux into an AC power signal.

The AC power signal is passed to an AC/DC converter 905. The AC/DC conversion function can be achieved by an active (switch-based) or passive (diode-based) rectifier.

The resultant DC signal is used to charge the energy storage device 906, nominally a rechargeable chemical battery, but also could be a one or more of a capacitor bank, reversable fuel cell, solid state battery or a hybrid combination of the aforementioned. The DC signal can also be used to power an electrical device directly.

Being bidirectional, the energy storage device 906 can output stored power as direct current to the reverse transmission path. The DC power is converted by the DC/AC inverter 907 to the necessary AC power signal.

This AC power signal is input into the resonant induction circuit 904. In this reverse path scenario, the coils are reversed in operation from the forward path. The AC power is converted to magnetic flux in the primary coil of the open core transformer 904 which is inductively coupled with the secondary coil. The secondary coil converts the received magnetic flux into an AC power signal. The resultant AC power is adjusted in frequency by the AC/AC converter 908. In one embodiment, an AC/DC/AC converter is used as the AC/AC converter 908, where the AC/AC frequency adjustment operation is accomplished using a AC/DC rectifier and then converted from DC to AC at the required frequency by an inverter circuit. The utility grid 901 in this example includes the necessary transformers to translate the AC power to the desired voltage and AC/DC conversion if necessary, for interfacing with utility supplied power.

Computer Implementation of Features

FIG. 10 is a block diagram illustrating circuitry for performing methods and implementing processing features according to example embodiments. For example, the processing circuitry of FIG. 10 may be used to implement the cryptographic processing functions of the communications controller, the thermal and power management functions, the intrusion detection functions, and the management of the historical usage profiles and quality models. All components need not be used in various embodiments.

FIG. 10 illustrates one example of a computing device in the form of a computer 1000 that may include a processing unit 1002, memory 1004, removable storage 1006, and non-removable storage 1008. Although the example computing device is illustrated and described as computer 1000, the computing device may be in different forms in different embodiments. For example, the computing device may instead be a smartphone, a tablet, smartwatch, or other computing device including the same or similar elements as illustrated and described with regard to FIG. 10. Devices, such as smartphones, tablets, and smartwatches, are generally collectively referred to as mobile devices or user equipment. Further, although the various data storage elements are illustrated as part of the computer 1000, the storage may also or alternatively include cloud-based storage accessible via a network, such as the Internet or server-based storage.

Memory 1004 may include volatile memory 1010 and non-volatile memory 1012. Computer 1000 also may include, or have access to a computing environment that includes, a variety of computer-readable media, such as volatile memory 1010 and non-volatile memory 1012, removable storage 1006 and non-removable storage 1008. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1000 may further include or have access to a computing environment that includes input interface 1014, output interface 1016, and a communication interface 1018. Output interface 1016 may include a display device, such as a touchscreen, that also may serve as an input device. The input interface 1014 may include one or more of a touchscreen, touchpad, mouse, keyboard, camera, one or more device-specific buttons, one or more sensors integrated within or coupled via wired or wireless data connections to the computer 1000, and other input devices.

The computer 1000 may operate in a networked environment using communication interface 1018 to connect to one or more remote computers. The remote computer may include a personal computer (PC), server, router, network PC, a peer device or other common network switch, or the like. The communication connection accessed via communication interface 1018 may include a Local Area Network (LAN), a Wide Area Network (WAN), cellular, Wi-Fi, Bluetooth, Zigbee, or other networks. According to one embodiment, the various components of computer 1000 are connected with a system bus 1020.

Computer-readable instructions stored on a computer-readable medium are executable by the processing unit 1002 of the computer 1000, such as a program 1022. The program 1022 in some embodiments comprises software that, when executed by the processing unit 1002, performs operations according to any of the embodiments included herein. A hard drive, CD-ROM, and RAM are some examples of articles including a non-transitory computer-readable medium, such as a storage device. The terms computer-readable medium and storage device do not include carrier waves to the extent carrier waves are deemed too transitory. Storage can also include networked storage, such as a storage area network (SAN). Computer program 1022 may be used to cause processing unit 1002 to perform one or more methods or functions described herein.

It should be further understood that software including one or more computer-executable instructions that facilitate processing and operations as described above with reference to any one or all of steps of the disclosure may be installed in and sold with one or more of the battery units or discharge units described herein. Alternatively, the software may be obtained and loaded into one or more battery units or discharge units in a manner consistent with the disclosure, including obtaining the software through physical medium or distribution system, including, for example, from a server owned by the software creator or from a server not owned but used by the software creator. The software may be stored on a server for distribution over the Internet, for example.

Also, it will be understood by one skilled in the art that this disclosure is not limited in its application to the details of construction and the arrangement of components set forth in the above description or illustrated in the drawings. The embodiments herein are capable of other embodiments, and capable of being practiced or carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The components of the illustrative devices, systems and methods employed in accordance with the illustrated embodiments may be implemented, at least in part, in digital electronic circuitry, analog electronic circuitry, or in computer hardware, firmware, software, or in combinations of them. These components also may be implemented, for example, as a computer program product such as a computer program, program code or computer instructions tangibly embodied in an information carrier, or in a machine-readable storage device, for execution by, or to control the operation of, data processing apparatus such as a programmable processor, a computer, or multiple computers.

A computer program may be written in any form of programming language, including compiled or interpreted languages, and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. Also, functional programs, codes, and code segments for accomplishing the systems and methods described herein may be easily construed as within the scope of the disclosure by programmers skilled in the art to which the present disclosure pertains. Method steps associated with the illustrative embodiments may be performed by one or more programmable processors executing a computer program, code or instructions to perform functions (e.g., by operating on input data and generating an output). Method steps may also be performed by, and apparatus may be implemented as, special purpose logic circuitry, e.g., an FPGA (field programmable gate array) or an ASIC, for example.

The various illustrative logical blocks, modules, and circuits described in connection with the embodiments disclosed herein may be implemented or performed with a general purpose processor, a digital signal processor (DSP), an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Processors suitable for the execution of a computer program include, by way of example, both general and special purpose microprocessors, and any one or more processors of any kind of digital computer. Generally, a processor will receive instructions and data from a read-only memory or a random-access memory or both. The elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., electrically programmable read-only memory or ROM (EPROM), electrically erasable programmable ROM (EEPROM), flash memory devices, and data storage disks (e.g., magnetic disks, internal hard disks, or removable disks, magneto-optical disks, compact disc ROM (CD-ROM), or digital versatile disc ROM (DVD-ROM). The processor and the memory may be supplemented by, or incorporated in, special purpose logic circuitry.

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art may further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. A software module may reside in random access memory (RAM), flash memory, ROM, EPROM, EEPROM, registers, hard disk, a removable disk, a CD-ROM, or any other form of storage medium known in the art. A sample storage medium is coupled to the processor such the processor may read information from, and write information to, the storage medium. In the alternative, the storage medium may be integral to the processor. In other words, the processor and the storage medium may reside in an integrated circuit or be implemented as discrete components.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., EEPROM), and any suitable combination thereof. The term "machine-readable medium" should be taken to include a single medium or multiple media (e.g., a centralized or distributed database, or associated caches and servers) able to store processor instructions. The term "machine-readable medium" shall also be taken to include any medium, or combination of multiple media, that is capable of storing instructions for execution by one or more processors, such that the instructions, when executed by one or more processors cause the one or more processors to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" as used herein excludes signals per se.

ALTERNATIVE EMBODIMENTS

External Cooling/Heating Supply

Depending on the power load, charging load, external ambient temperature and/or battery chemistry, environmental couplers may need be added to the contactless battery unit for the use of forced air or liquid coolants from an external supply. While the sealed case provides contact surfaces for cooling by conduction and convective means, connection ports allowing limited access to the battery pack may be needed. While this installation type complicates the replacement of a battery unit, the segregation of the battery unit's internal cooling system would limit access to the rest of the sealed battery unit. The environmental control electronics with its temperature sensor network would be supplemented with the addition of pressure sensors in those contactless battery units designed to allow the ingress and egress of coolants via air or liquid valved connection ports.

In some deployments, external heating of contactless battery units via use of heated forced air or liquid coolants would be similarly equipped and monitored.

Fuel Cell Use

The contactless replaceable battery unit 101 described herein could be used with fuel cells in place of chemical batteries. Offboard fueling would provide the same warehousing and safe charging of potentially hazardous fuels and oxidizers. The contactless design would provide the same lack of electrical contacts. The fuel and oxidizer inputs would by necessity compromise the sealed case but would be opened for replenishment. The replenishment facility could be sited away from the use site, granting more protection to the driver and passengers when used in a vehicle or for those nearby in non-vehicle use.

Those skilled in the art will appreciate that while the disclosure contained herein pertains to the provision of electrical power to vehicles, it should be understood that this is only one of many possible applications, and other embodiments including non-vehicular applications are possible. For example, those skilled in the art will appreciate that there are numerous applications of providing batteries in non-vehicle inductive charging applications such as portable consumer electronic device chargers, such as those (e.g., PowerMat™) used to charge toothbrushes, cellular telephones, and other devices. Large capacity, but still portable, contactless swappable battery packs can be moved, by rail for example, to areas hit by a natural or manmade disaster for crucial electrically powered services. Accordingly, these and other such applications are included within the scope of the following claims.

What is claimed:

1. A battery system comprising:
    a battery unit;
    a sealable case adapted to house the battery unit and adapted to fit into a battery unit socket of a vehicle, the battery unit socket adapted for loading and unloading of battery units into the vehicle;
    at least one wireless power transmission coupler connected to the battery unit and disposed within the sealable case, the at least one wireless power transmission coupler disposed with respect to at least one face of the sealable case to enable magnetic inductive signaling for charging, discharging, and communication between the battery unit and a wireless transmission coupler of the vehicle, whereby the at least one wireless power transmission coupler geometrically aligns with the wireless transmission coupler of the vehicle for wireless power transfer; and
    a secure memory within the sealable case that stores an historical operating profile of the battery unit, the historical operating profile comprising a record of communication sessions, physical intrusions into the sealable case, and software access attempts, as well as sensor readings including at least one of temperature of the battery unit over time, a discharge cycle of the battery unit over time, a rate of charge and discharge of the battery during use, accelerometer measurements over time, voltage levels of the battery unit over time, or current levels of the battery unit over time.

2. The battery system as in claim 1, wherein the sealable case is dustproof and waterproof.

3. The battery system as in claim 1, wherein the battery unit comprises a plurality of battery cells, where each cell comprises a chemical cell, a capacitive cell, a fuel cell, or a hybrid array of at least two of a chemical cell, a capacitive cell, and a fuel cell.

4. The battery system as in claim 1, wherein the at least one wireless power transmission coupler comprises 1 to n*m wireless power transmission couplers dependent upon a voltage, current or power to be supplied by the battery unit, where n is a number of flat sides of the sealable case and m is a number of wireless power transmission couplers per flat side.

5. The battery system as in claim 1, further comprising a holding element included on each lateral corner of the sealable case to hold the battery system firmly to minimize lateral vibration while the battery system is in use or is being charged.

6. The battery system as in claim 1, further comprising a locking retention element on an end of the sealable case for securing the battery system in position during use and during charging.

7. The battery system as in claim 1, further comprising a connectionless interface on the sealable case for providing at least one of cooling and heating via conduction to internal components of the sealable case during use and during charging of the battery system.

8. The battery system as in claim 1, further comprising an inductive communications link interface within the sealable case, the inductive communications link interface enabling wireless communications between the battery unit and at least one of a discharge station and a charging station.

9. The battery system as in claim 8, further comprising a communications controller within the sealable case, the communications controller preventing communications access to the battery unit without authentication using an encryption key.

10. The battery system as in claim 8, wherein the inductive communications link interface comprises at least one of a full duplex magnetic inductive communications link, a cellular radio, and a short range transceiver.

11. The battery system as in claim 1, further comprising at least one sensor disposed within the sealable case, the at least one sensor measuring at least one of temperature within the sealable case, voltage output by the battery unit, current output by the battery unit, or acceleration of the battery unit.

12. The battery system as in claim 11, further comprising a power management system within the sealable case, the power management system comprising a hardware security module that logs readings from the at least one sensor in a secured permanent record.

13. The battery system as in claim 12, further comprising an intrusion detection system disposed within the sealable case, the intrusion detection system detecting attempts to open the sealable case and attacks on electronics within the sealable case and recording any detected attempts to open the sealable case and attacks on electronics within the sealable case in the secured permanent record.

14. The battery system as in claim 11, further comprising a battery backup for the at least one sensor, the battery backup allowing sensor data to be recorded before shutdown of the battery system in the event of a catastrophic failure.

15. The battery system as in claim 1, further comprising a charging cradle having a surrounding enclosure that accepts the sealable case, the charging cradle comprising at least one charging point that connects wirelessly to the at least one wireless power transmission coupler when the sealable case is disposed in the charging cradle.

16. The battery system as in claim 15, further comprising a communications controller within the sealable case, the communications controller communicating with the charging cradle via an encrypted wireless communication link.

17. The battery system as in claim 1, wherein the sealable case further comprises vias that pass through the sealable case and that are adapted for handling of the sealable case by a forklift.

18. A clustered battery system comprising a plurality of the battery systems of claim 1 in a horizontal cluster arrangement whereby at least one wireless power transmission coupler of each battery system is aligned with at least one wireless power transmission coupler of another battery system to distribute power amongst the battery systems in the horizontal cluster arrangement.

19. The clustered battery system as in claim 18, further comprising a bottom tray that holds the plurality of battery systems to assure alignment of respective wireless power transmission couplers of respective battery systems, the bottom tray further providing a communications interface to the plurality of battery systems and a power connection to supply or deliver power to or from the plurality of battery systems.

20. A clustered battery system comprising a plurality of the battery systems of claim 1 in a vertical cluster arrangement whereby at least one wireless power transmission coupler of each battery system is aligned with at least one wireless power transmission coupler of another battery system to distribute power amongst the battery systems in the vertical cluster arrangement.

21. The clustered battery system as in claim 20, further comprising a bottom tray that holds the plurality of battery systems to assure alignment of respective wireless power transmission couplers of respective battery systems, the bottom tray further providing a communications interface to the plurality of battery systems and a power connection to supply or deliver power to or from the plurality of battery systems.

22. The battery system as in claim 1, further comprising a battery controller that generates a numerical quality figure from the historical operating profile and securely stores the numerical quality figure in the secure memory.

* * * * *